(12) United States Patent
     Plate

(10) Patent No.: US 10,717,324 B2
(45) Date of Patent: Jul. 21, 2020

(54) VERTICALLY ADJUSTABLE CASTER WHEEL

(71) Applicant: Ross Design & Engineering, Inc., Somerset, MI (US)

(72) Inventor: Jack Plate, Clark Lake, MI (US)

(73) Assignee: Ross Design & Engineering, Inc., Somerset, MI (US)

( * ) Notice: Subject to any disclaimer, the term of this patent is extended or adjusted under 35 U.S.C. 154(b) by 0 days.

(21) Appl. No.: 16/142,645

(22) Filed: Sep. 26, 2018

(65) Prior Publication Data

US 2019/0092095 A1 Mar. 28, 2019

Related U.S. Application Data

(60) Provisional application No. 62/563,149, filed on Sep. 26, 2017.

(51) Int. Cl.
  *B60B 33/06* (2006.01)
  *B60B 33/04* (2006.01)
  *B60B 33/00* (2006.01)
  *B60B 33/02* (2006.01)

(52) U.S. Cl.
  CPC .......... *B60B 33/04* (2013.01); *B60B 33/0042* (2013.01); *B60B 33/025* (2013.01)

(58) Field of Classification Search
  CPC ... Y10T 16/182; Y10T 16/193; Y10T 16/195; Y10T 16/1937; Y10T 16/3834; B60B 33/04; B60B 33/06; B60B 33/063; B60B 33/0068; B60B 33/0089; B60B 33/0042; B60B 33/025; B60B 2900/131
  See application file for complete search history.

(56) References Cited

U.S. PATENT DOCUMENTS

| 1,480,588 | A | * | 1/1924 | Wise | A47L 5/34 |
| | | | | | 16/19 |
| 1,772,314 | A | * | 8/1930 | Hormes | E05D 15/0673 |
| | | | | | 16/100 |
| 1,780,755 | A | * | 11/1930 | Kurtzon | E05D 15/0673 |
| | | | | | 16/100 |
| 1,810,971 | A | * | 6/1931 | Lee | B60B 33/04 |
| | | | | | 248/188.4 |

(Continued)

FOREIGN PATENT DOCUMENTS

DE  36 18 448 A1  10/1987
EP  0 697 296 A1   2/1996

(Continued)

OTHER PUBLICATIONS

International Search Report dated Nov. 19, 2018 for PCT Patent Application Serial No. PCT/US2018/052928, dated Nov. 28, 2018.

*Primary Examiner* — Chuck Y Mah
(74) *Attorney, Agent, or Firm* — Young Basile Hanlon & MacFarlane, P.C.

(57) ABSTRACT

A caster wheel assembly for an industrial vehicle comprising a lower housing connected to a wheel, an upper housing connectable to the industrial vehicle, and an inner alignment post disposed within the lower and upper housings. The upper housing is at least partially disposed within the lower housing. Rotation of the inner alignment post relative to the upper housing adjusts vertical displacement of the lower housing relative to the upper housing.

20 Claims, 8 Drawing Sheets

(56) References Cited

U.S. PATENT DOCUMENTS

| | | | | |
|---|---|---|---|---|
| 2,385,154 | A * | 9/1945 | Nalle | B60B 33/04 16/19 |
| 2,425,675 | A | 8/1947 | Graff | |
| 2,592,942 | A * | 4/1952 | Moore | F16M 11/125 248/184.1 |
| 2,749,564 | A * | 6/1956 | Tally | A47L 11/4058 15/79.2 |
| 4,364,148 | A * | 12/1982 | McVicker | B60B 33/0002 16/32 |
| 4,414,702 | A | 11/1983 | Neumann | |
| 4,723,633 | A * | 2/1988 | Duncan | E04G 5/02 16/19 |
| 4,789,121 | A | 12/1988 | Gidseg et al. | |
| 4,918,783 | A * | 4/1990 | Chu | B60B 33/04 16/19 |
| 5,042,110 | A * | 8/1991 | Orii | B60B 33/0042 16/32 |
| 5,332,182 | A * | 7/1994 | Weisz | F16M 7/00 248/188.4 |
| 5,457,849 | A * | 10/1995 | Branson | B60B 33/04 16/19 |
| 5,881,979 | A * | 3/1999 | Rozier, Jr. | A47B 91/024 248/188.4 |
| 6,796,001 | B1 * | 9/2004 | Finkelstein | B60B 33/0002 16/19 |
| 6,839,937 | B2 * | 1/2005 | Miller | B60B 33/0007 16/32 |
| 6,886,216 | B2 | 5/2005 | Graham et al. | |
| 7,077,369 | B2 * | 7/2006 | Hardin | F16M 11/36 16/19 |
| 7,159,829 | B1 * | 1/2007 | Finkelstein | B60B 33/04 108/144.11 |
| 7,350,269 | B2 | 4/2008 | Dominic et al. | |
| 7,356,877 | B2 * | 4/2008 | Kim | B60B 33/0007 16/105 |
| 7,571,887 | B2 * | 8/2009 | Finkelstein | B60B 33/04 248/188.4 |
| 8,136,201 | B2 * | 3/2012 | Yantis | A47B 91/022 16/18 R |
| 8,424,887 | B1 | 4/2013 | LeMeur, Jr. et al. | |
| 8,839,487 | B2 | 9/2014 | Plate | |
| 9,380,894 | B2 * | 7/2016 | Martenson | A47G 9/00 |
| 9,416,483 | B1 * | 8/2016 | Freakes | D06F 39/125 |
| 2001/0049859 | A1 | 12/2001 | Lewis et al. | |
| 2003/0041409 | A1 * | 3/2003 | Caporale | B60B 33/0005 16/19 |
| 2003/0061681 | A1 * | 4/2003 | Plate | B60B 33/0002 16/19 |
| 2006/0075600 | A1 | 4/2006 | Dominic et al. | |
| 2007/0169307 | A1 | 7/2007 | Yu et al. | |
| 2018/0370281 | A1 * | 12/2018 | Hall | B60B 33/063 |

FOREIGN PATENT DOCUMENTS

| | | | | |
|---|---|---|---|---|
| FR | 2 580 551 A1 | | 10/1986 | |
| FR | 2 622 151 A1 | | 4/1989 | |
| GB | 568276 A | * | 3/1945 | A47B 91/022 |
| JP | 07228103 A | * | 8/1995 | |
| JP | 2000245555 A | * | 9/2000 | |
| JP | 2001233002 A | * | 8/2001 | |
| JP | 2004 075040 A | | 3/2004 | |
| JP | 2015 093499 A | | 5/2015 | |
| LU | 37 243 A1 | | 5/1959 | |

\* cited by examiner

VERTICALLY ADJUSTABLE CASTER WHEEL

CROSS-REFERENCE TO RELATED APPLICATION(S)

This application claims the benefit of, and priority to, U.S. Provisional Patent Application Ser. No. 62/563,149, filed on Sep. 26, 2017, the entire content of which is hereby incorporated by reference.

TECHNICAL FIELD

This disclosure relates to caster wheels, and more particularly to a caster wheel that is vertically adjustable from a top of the caster wheel.

BACKGROUND

Heavy-duty caster wheels are frequently used to support relatively heavy loads transported by small forklift trucks, material handling carts, and the like. To adjust the height of the caster wheel, many designs require the caster wheel to be partially or entirely disassembled. Other caster wheel designs provide angular or height adjustment by accessing fasteners and/or springs from the bottom or sides of the caster wheel. In either instance, adjusting the height of the caster wheel may be a timely and inconvenient task. Therefore, a need exists for a quick and simple method for providing vertical adjustment of the caster wheel.

SUMMARY

In one aspect of the present disclosure, a caster wheel assembly is described for use with an industrial vehicle, for example. The caster wheel assembly includes a lower housing connected to a wheel, an upper housing connectable to the industrial vehicle, and an inner alignment post disposed within the lower and upper housings. The upper housing is at least partially disposed within the lower housing. Rotation of the inner alignment post relative to the upper housing adjusts vertical displacement of the lower housing relative to the upper housing.

In another aspect of the present disclosure, an adjustable caster wheel assembly is described that includes a lower housing, an upper housing positioned with the lower housing and including a threaded portion, and an alignment post rotatably positioned within the upper housing. The alignment post includes a threaded portion that is configured and dimensioned for engagement with the threaded portion of the upper housing such that rotation of the alignment post in a first direction causes separation of the upper and lower housings to increase a height of the caster wheel assembly and rotation of the alignment post in a second direction causes approximation of the upper and lower housings to decrease a height of the caster wheel assembly.

In certain embodiments, the lower housing, the upper housing, and the alignment post may be positioned in concentric relation.

In certain embodiments, the alignment post may be configured, dimensioned, and positioned such that the alignment post is vertically accessible from above the upper housing.

In certain embodiments, the alignment post may include a first section including the threaded portion and a second, non-threaded section spaced longitudinally from the first section.

In certain embodiments, the alignment post may further include a shoulder positioned between the first and second sections.

In certain embodiments, the first section of the alignment post may define a first diameter, the second section of the alignment post may define a second diameter, and the shoulder may define a third diameter. In such embodiments, the third diameter may be greater than the first and second diameters.

In certain embodiments, the caster wheel assembly may further include a swivel bearing positioned within the lower housing. In such embodiments, the swivel bearing may include a bore that is configured and dimensioned to receive the alignment post.

In certain embodiments, the second section of the alignment post may be configured and dimensioned for insertion into the bore of the swivel bearing, for example, in a friction fit.

In certain embodiments, the caster wheel assembly may further include a rotation restriction member that is configured and dimensioned for engagement with the alignment post to restrict rotation of the alignment post.

In certain embodiments, the rotation restriction member may include an engagement structure that is configured and dimensioned for engagement with a corresponding receiving structure formed on the alignment post. For example, in certain embodiments, the engagement structure may include a pair of legs, and the receiving structure may include a pair of longitudinal cutouts that are configured and dimensioned to receive the legs.

In certain embodiments, the upper housing may include opposing ends each defining openings that are approximately equivalent in diameter and a bore extending between the opposing ends. In such embodiments, the bore may include a center region with a stepped configuration defining a diameter less than the diameters defined by the openings at the opposing ends of the upper housing whereby the center region of the bore includes an internal shoulder.

In certain embodiments, the center region of the bore may include a plurality of internal shoulders defining progressively smaller diameters.

In certain embodiments, the caster wheel assembly may further include a stop member to limit vertical adjustment of the caster assembly.

In certain embodiments, the stop member may be configured, dimensioned, and positioned for engagement with the lower housing.

In another aspect of the present disclosure, an adjustable caster wheel assembly is described that includes first and second housings that are configured and dimensioned for relative displacement along a vertical axis, and an alignment post that is positioned concentrically with respect to the first and second housings. The alignment post is configured and dimensioned for rotation to cause relative displacement between the first and second housings along the vertical axis to vary a height of the caster wheel assembly. The alignment post is also configured, dimensioned, and positioned such that the alignment post is vertically accessible from above the first and second housings.

In certain embodiments, the alignment post may include a threaded section configured and dimensioned for engagement with a corresponding threaded section in the first housing such that rotation of the alignment post in a first direction causes separation of the first and second housings and rotation of the alignment post in a second direction causes approximation of the first and second housings.

In certain embodiments, the caster wheel assembly may further include a rotation restriction member that is configured and dimensioned for engagement with the alignment post to restrict rotation of the alignment post.

In another aspect of the present disclosure, a method is disclosed for adjusting the height of a caster wheel assembly. The method includes vertically accessing an alignment post from above the caster wheel assembly and rotating the alignment post in relation to first and second housings of the caster wheel assembly to cause relative displacement of the first and second housings along a vertical axis.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

FIGS. 1-4 illustrate a caster wheel assembly 10 that can be vertically adjusted from the top of the caster wheel assembly 10. As a result, the vertical height of the caster wheel assembly 10 can be increased or decreased while the caster wheel assembly 10 is attached to an industrial vehicle (not shown), such as a forklift truck. Consequently, the vertical height of the caster wheel assembly 10 can be adjusted by accessing the caster wheel assembly 10 through an aperture in the floor of the industrial vehicle, thereby avoiding the need to disassemble the caster wheel assembly 10 or accessing the caster wheel assembly 10 from underneath the industrial vehicle.

Figure 5:
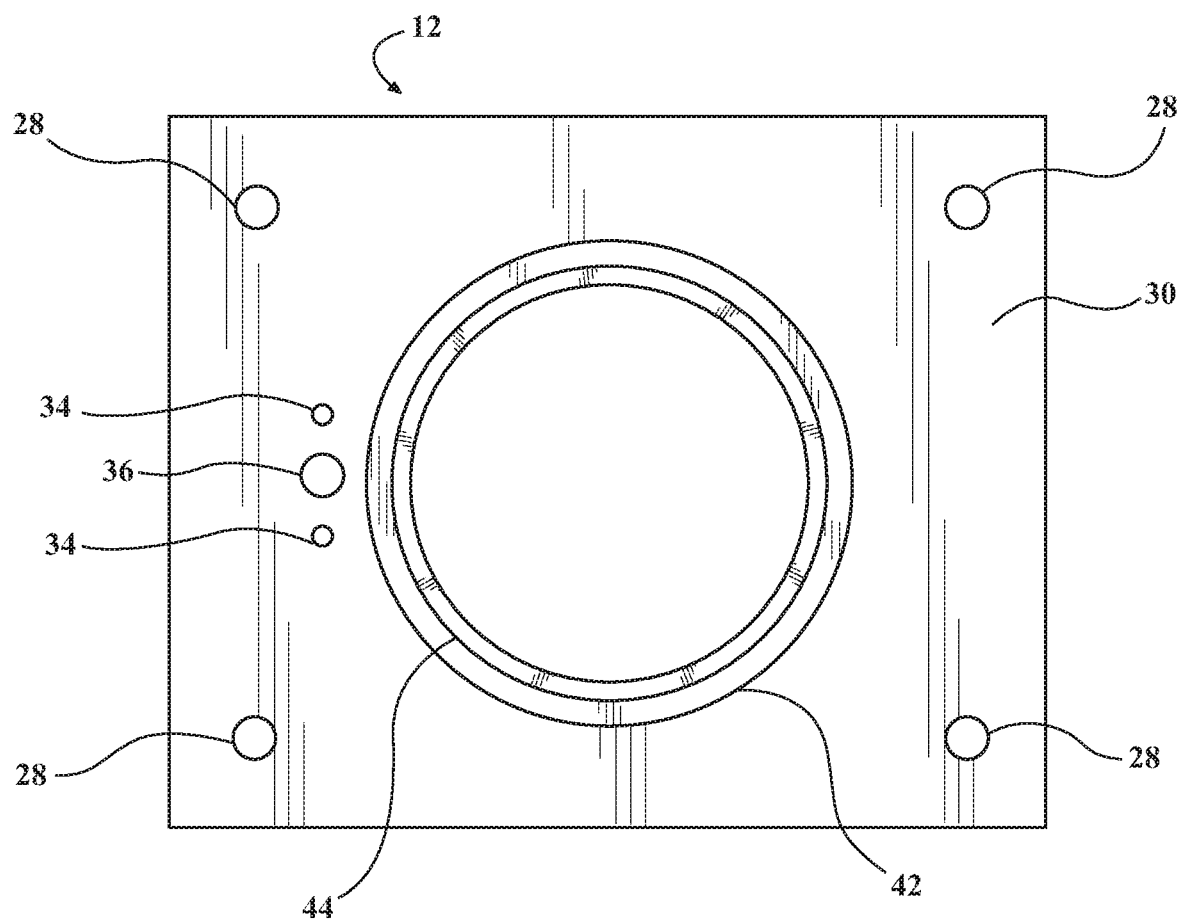
FIG. 5 is a top, plan view of a mounting member of the vertically adjustable caster wheel assembly.

The caster wheel assembly 10 can include a mounting plate 12, an upper housing 14, a lower housing 16, an axle housing 18, an axle 20, an inner alignment post 22, a stop block 24, and one or more wheels 26. In order to connect the caster wheel assembly 10 to the industrial vehicle, the mounting plate 12, as illustrated in detail in FIGS. 5-6, can be made from any suitable material, such as steel. As shown, the mounting plate 12 has a substantially rectangular cuboid configuration, although other configurations are possible. To assist with mounting the caster wheel assembly 10 to the industrial vehicle, the mounting plate 12 can be provided with first apertures 28 that extend through a top face 30 and a bottom face 32 of the mounting plate 12. Each first aperture 28 can be capable of receiving a conventional fastener (not shown), such as a screw, that extends through the first aperture 28 and is received by a corresponding aperture in a frame of the industrial vehicle. As shown, there are four first apertures 28 that are positioned adjacent to four corners of the mounting plate 12. The number and positioning of the first apertures 28 can vary depending on the implementation.

To limit the amount of vertical adjustment provided by the caster wheel assembly 10, the stop block 24 is mounted to the mounting plate 12 through two second apertures 34 and/or a third aperture 36 that extend through the top face 30 and the bottom face 32 of the mounting plate 12, wherein the third aperture 36 is between the second apertures 34. The second apertures 34 are each capable of receiving a roll pin 38 (shown in FIG. 1), and the third aperture 36 can receive a conventional fastener, such as a screw 40 (shown in FIG. 1). The third aperture 36 can have a diameter larger than diameters of the second apertures 34.

Figure 6:
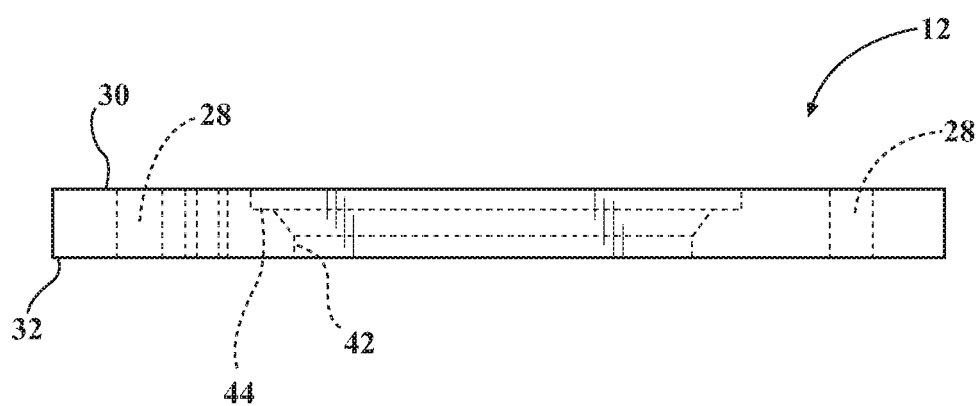
FIG. 6 is a side, plan view of the mounting member of the vertically adjustable caster wheel assembly.

To assist with connecting the upper housing 14 to the mounting plate 12, the mounting plate 12 can be provided with a fourth aperture 42 that is centrally located and has a diameter that is slightly larger than an outer diameter of a center region 64 of the upper housing 14. The upper housing 14 and the mounting plate 12 can be welded together to form an integral unit. As shown in FIG. 6, the fourth aperture 42 extends through the mounting plate 12 from the top face 30 to the bottom face 32. As shown, the diameter of the fourth aperture 42 is substantially constant adjacent to the top face 30 of the mounting plate 12 and tapers inward toward the bottom face 32 of the mounting plate 12, forming a shoulder 44 where the diameter of the fourth aperture 42 tapers inward. The second apertures 34 and the third aperture 36 can be linearly aligned near the fourth aperture 42 so that the stop block 24 can interact with the lower housing 16, as will be explained.

Figure 7:
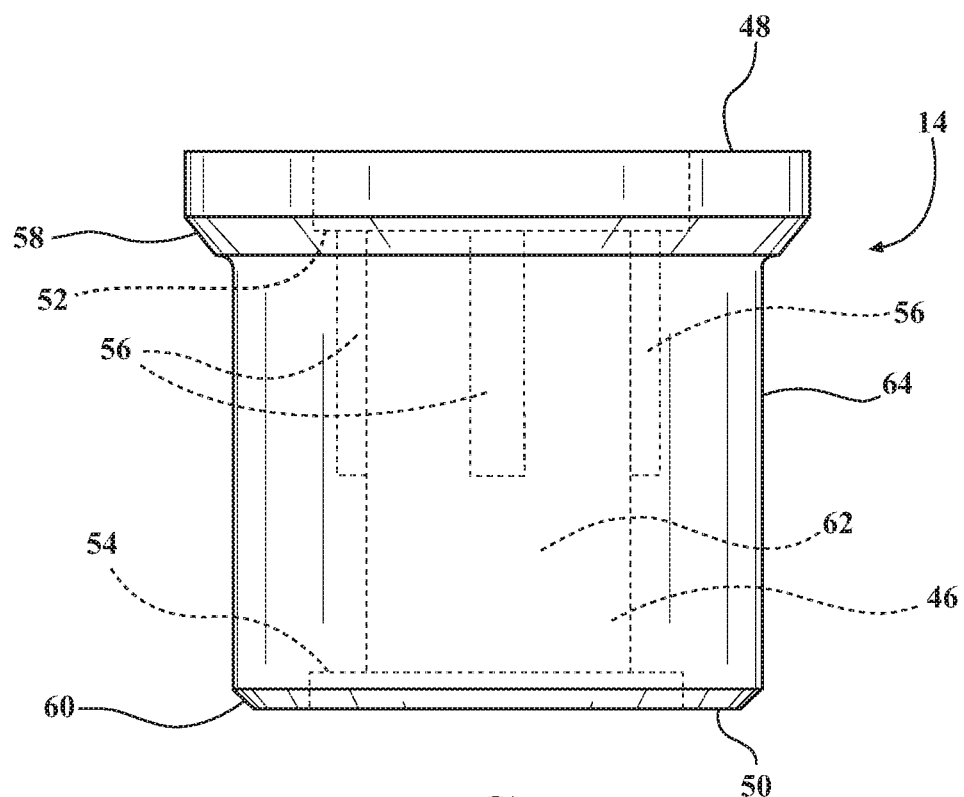
FIG. 7 is a side, plan view of an upper housing of the vertically adjustable caster wheel assembly.
Figure 8:
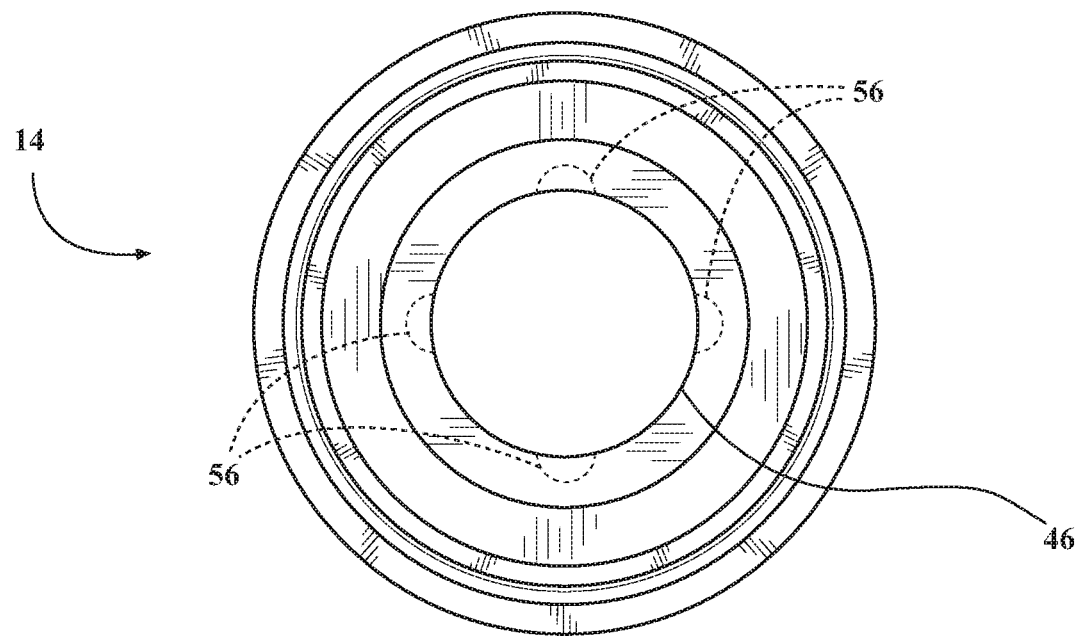
FIG. 8 is a top, plan view of the upper housing of the vertically adjustable caster wheel assembly.

The upper housing 14, shown in FIGS. 7-8, is matingly received by the fourth aperture 42 in the mounting plate 12, wherein the outer diameter of the upper housing 14 can be larger at the first end 48 of the upper housing 14 so that a first chamfer 58 can be seated against the top face 30 of the mounting plate 12 when the upper housing 14 is connected to the mounting plate 12 via the fourth aperture 42. A second chamfer 60 can be formed at the second end 50 of the upper housing 14 where the outer diameter of the upper housing 14 tapers further. The outer diameter of the upper housing 14 can remain substantially constant between the first chamfer 58 and the second chamfer 60. The upper housing 14 can have a substantially tubular configuration with a bore 46 extending through the upper housing 14 that is coaxial with the fourth aperture 42 of the mounting plate 12. The upper housing 14 can be fabricated from any suitable material, such as steel.

To prevent undesired vertical adjustment of the caster wheel assembly 10 through rotation of the inner alignment post 22, the bore 46 extends between a first end 48 and a second end 50 of the upper housing 14. As shown, the diameter of the bore 46 is stepped so that the first end 48 and the second end 50 of the upper housing 14 are substantially the same, and a center region 62 of the bore 46 is smaller than the first end 48 and the second end 50, defining a first shoulder 52 and a second shoulder 54. The center region 62 can be provided with threading. Cutouts 56 can extend into the upper housing 14 approximately half of the distance between the first shoulder 52 and the second shoulder 54. The cutouts 56 can have a substantially arcuate or C-shape cross-sectional configuration that is complementary to legs 144 of a rotation restriction member 142 (shown in FIG. 1).

Figure 9:
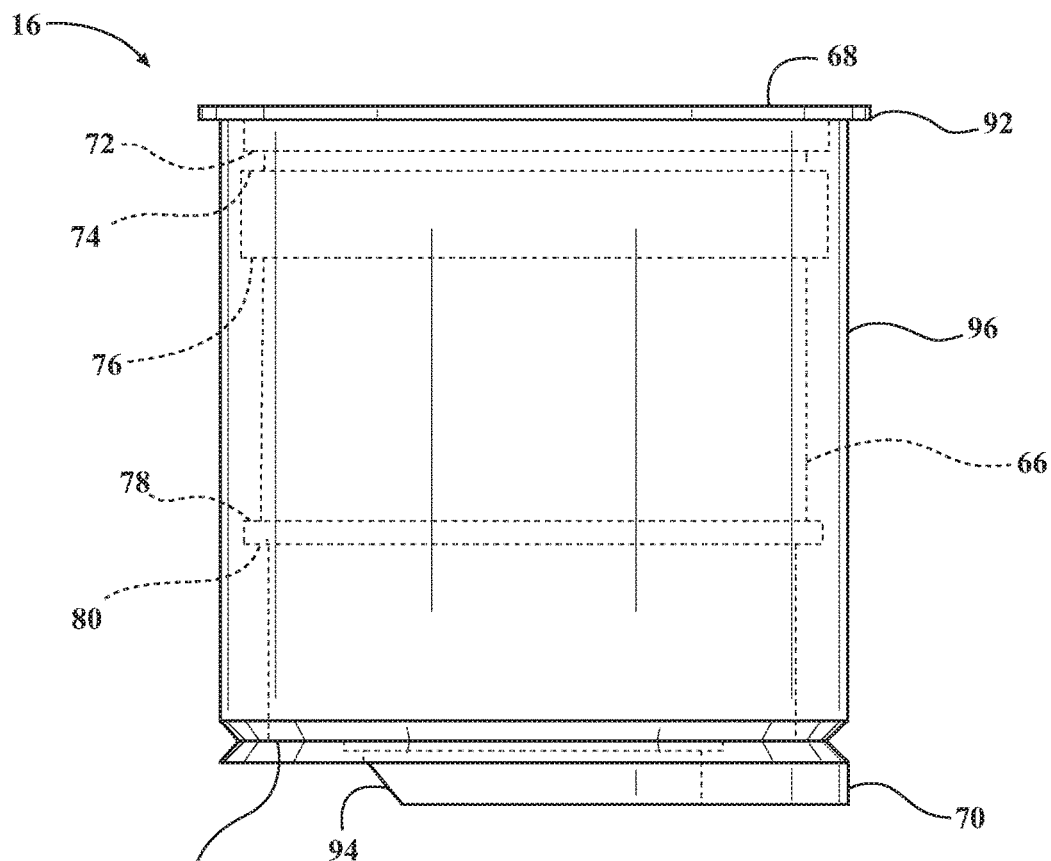
FIG. 9 is a side, plan view of a lower housing of the vertically adjustable caster wheel assembly.

To allow vertical displacement of the lower housing 16 relative to the upper housing 14, the upper housing 14 can be partially nested within a bore 66 of the lower housing 16. The lower housing 16 is illustrated in detail in FIG. 9 and can be made from any suitable material, such as steel. The lower housing 16 can have a substantially tubular configuration with the bore 66 extending through the lower housing 16 from a first end 68 to a second end 70. The bore 66 can be coaxially aligned with the bore 46 of the upper housing 14, and the diameter of the bore 66 may be stepped between the first end 68 and the second end 70 of the lower housing 16. As shown, the diameter of the bore 66 is stepped to define shoulders 72, 74, 76, 78, 80, 82 that house a snap ring 84, a wear ring 86, a flexible seal 88, and a swivel bearing 90 (shown in FIG. 1) to allow for rotation of the lower housing 16 relative to the upper housing 14.

The stepped diameter of the bore 66 of the lower housing 16 forms a first shoulder 72 near the first end 68 of the lower housing 16. The diameter of the bore 66 between the first end 68 and the first shoulder 72 can be sized to house the flexible seal 88. A second shoulder 74 and a corresponding third shoulder 76 are formed a short distance away from the first shoulder 72. The diameter of the bore 66 between the second shoulder 74 and the third shoulder 76 can be sized to house the wear ring 86. A fourth shoulder 78 and a corresponding fifth shoulder 80 can also be formed between the first end 68 and the second end 70 of the lower housing 16. The diameter of the bore 66 between the fourth shoulder 78 and the fifth shoulder 80 can be sized to house the snap ring 84. The diameter of the bore 66 between the first shoulder 72 and the second shoulder 74 and the diameter of the bore 66 between the second shoulder 74 and the third shoulder 76 can be substantially the same and can be sized to be slightly larger than the outer diameter of a center region 64 of the upper housing 14. A sixth tapered shoulder 82 can be formed near the second end 70 of the lower housing 16. The diameter of the bore 66 between the fifth shoulder 80 and the sixth shoulder 82 can be sized to house the swivel bearing 90.

Figure 1:
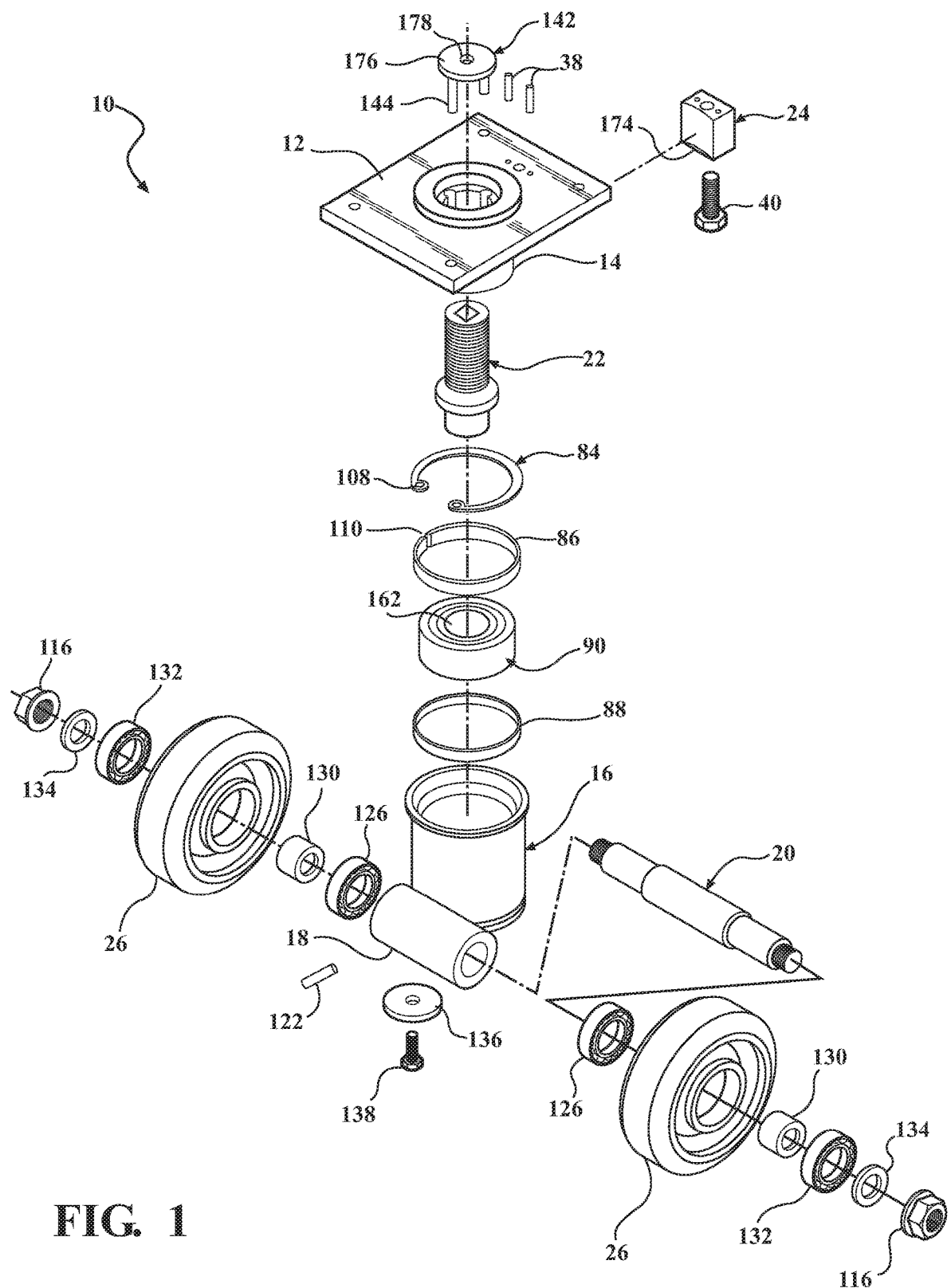
FIG. 1 is an exploded perspective view of a vertically adjustable caster wheel assembly.
Figure 2:
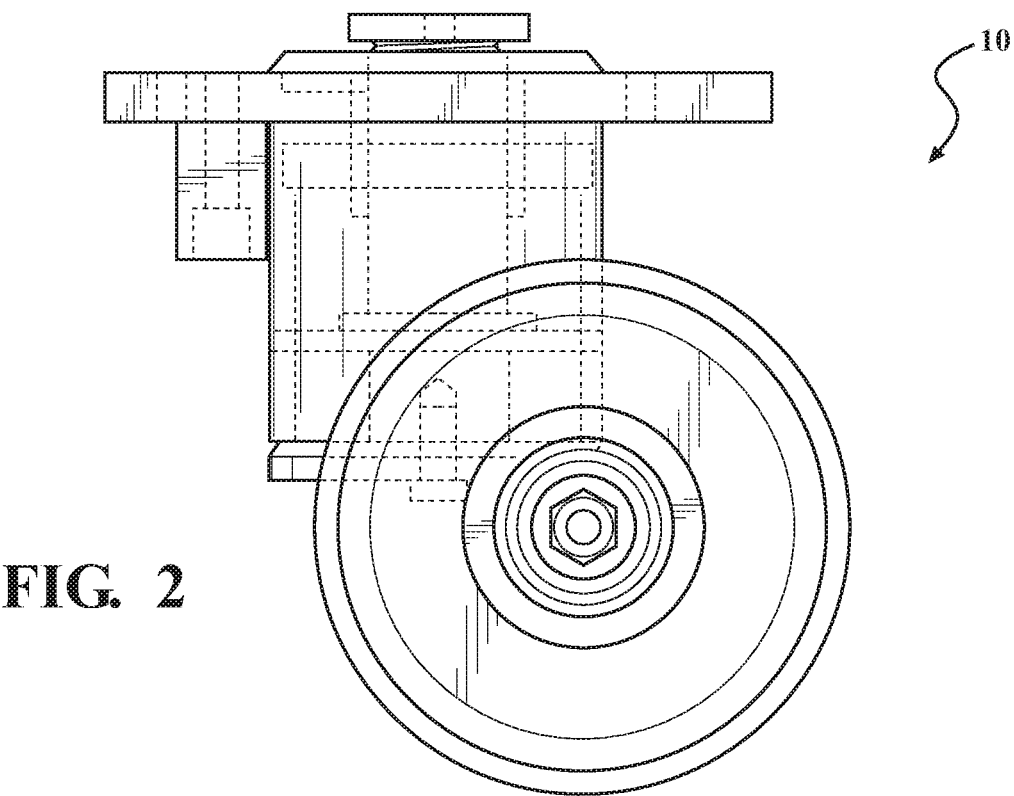
FIG. 2 is a side, plan view of the vertically adjustable caster wheel assembly.
Figure 3:
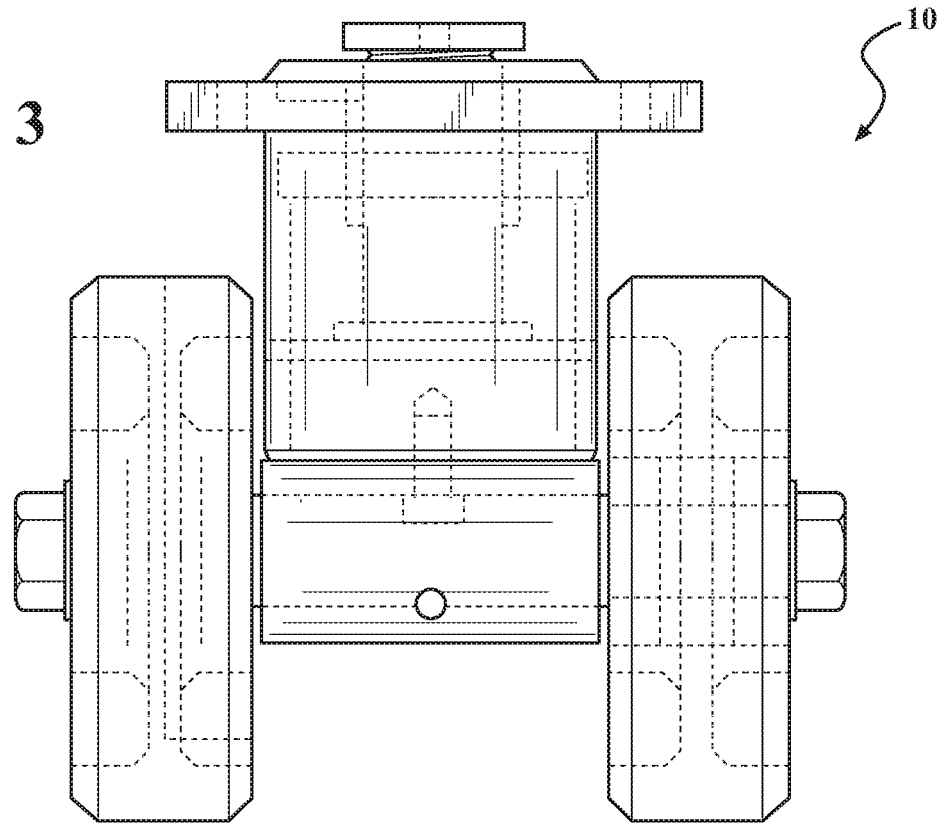
FIG. 3 is a front, plan view of the vertically adjustable caster wheel assembly.
Figure 4:
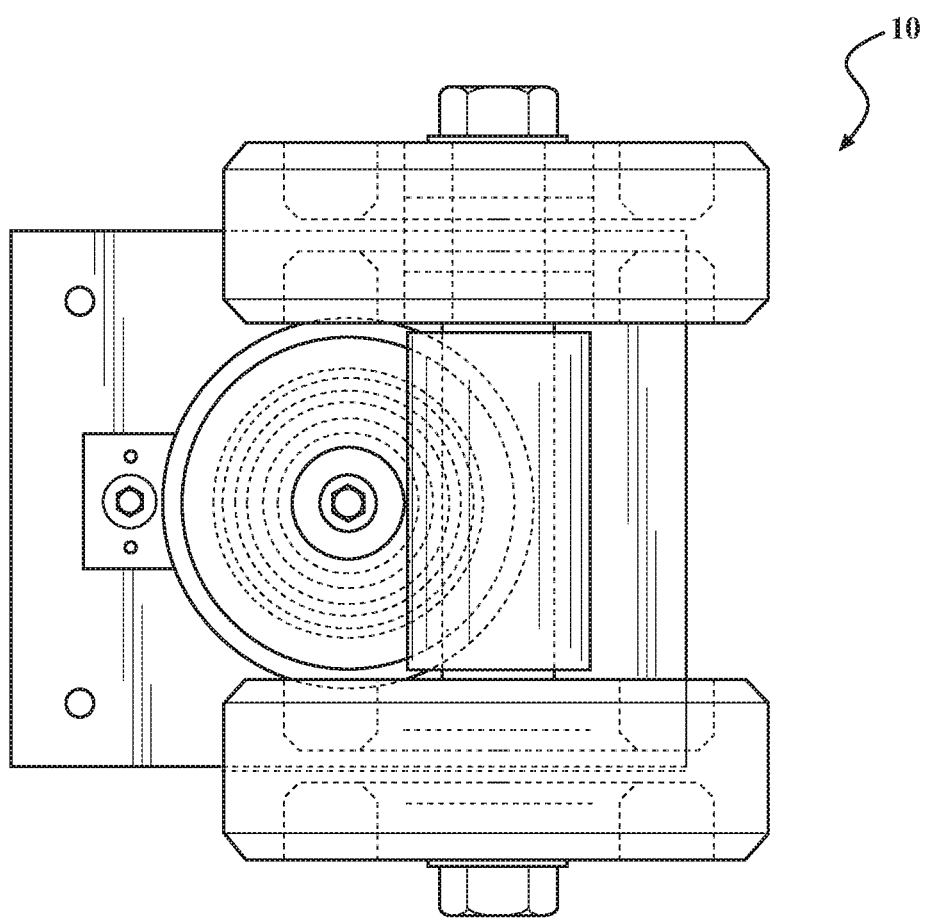
FIG. 4 is a top, plan view of the vertically adjustable caster wheel assembly.

The snap ring 84, the wear ring 86, and the flexible seal 88 can be made from any suitable material. For example, the snap ring 84 could be made from a metal, such as steel, and the wear ring 86 and the flexible seal 88 could be made from nylon or rubber. As shown in FIG. 1, the snap ring 84 can have a substantially C-shaped configuration that is slightly larger than the diameter of the bore 66 of the lower housing 16 between the first end 68 and the first shoulder 72 of the lower housing 16. As a result, ends 108 of the snap ring 84 can be close to touching or touching when the snap ring 84 is disposed within the lower housing 16. The wear ring 86 can have a substantially ring-like configuration with the exception of a cut 110 that forms ends to assist with inserting the wear ring 86 into the lower housing 16 between the second shoulder 74 and the third shoulder 76. The flexible seal 88 and the swivel bearing 90 can have substantially ring-like configurations. The swivel bearing 90 can be fabricated from any suitable material, such as steel, and have a thickness that is greater than a thickness of the flexible seal 88. The swivel bearing 90 can be provided with a lubricant that the flexible seal 88 assists with containing.

The lower housing 16 can further include a lip 92 adjacent to the first end 68, and a recess 94 formed on the second end 70. The lip 92 can extend substantially perpendicular from an outer surface 96 of the lower housing 16 to interact with the stop block 24. The recess 94 can have a substantially arcuate configuration, which allows the axle housing 18 to be mounted and/or welded flush against the lower housing 16.

Figure 10:
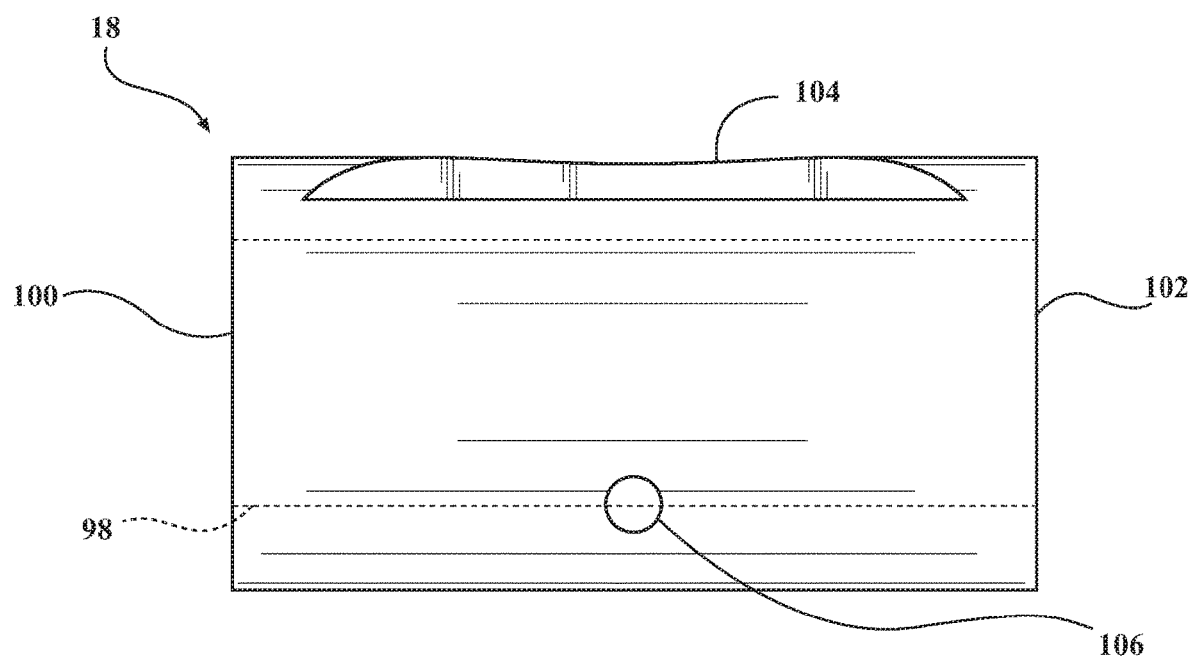
FIG. 10 is a rear, plan view of an axle housing of the vertically adjustable caster wheel assembly.
Figure 11:
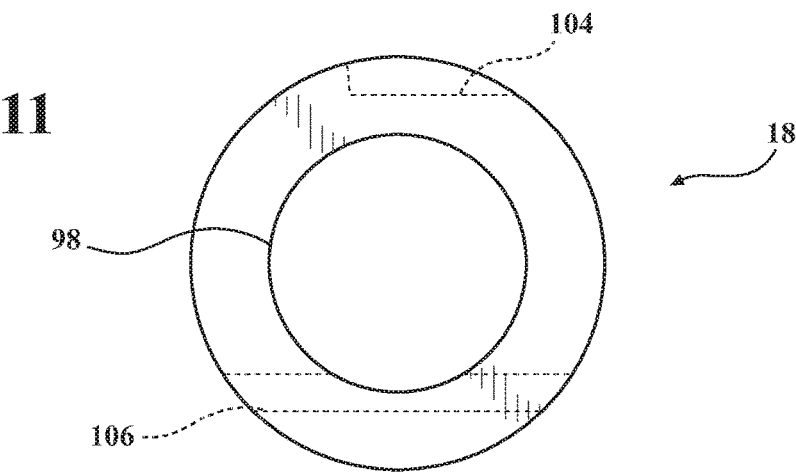
FIG. 11 is a side, plan view of the axle housing of the vertically adjustable caster wheel assembly.

The axle housing 18 is illustrated in detail in FIGS. 10-11 and can be made from any suitable material, such as steel. The axle housing 18 can have a substantially tubular configuration with a bore 98 extending through the axle housing 18 from a first end 100 to a second end 102. The axle housing 18 can have a cutout 104 that allows the axle housing 18 to be mounted and/or welded flush against the lower housing 16. As shown, the cutout 104 has a generally triangular configuration with two sides having a substantially linear configuration and a third side having a generally arcuate configuration. The axle housing 18 can also be provided with an aperture 106 that extends through the axle housing 18 substantially perpendicular to the bore 98 of the axle housing 18 and is in communication with the bore 98 of the axle housing 18. The aperture 106 can be spaced approximately half way between the first end 100 and the second end 102 of the axle housing 18.

Figure 12:
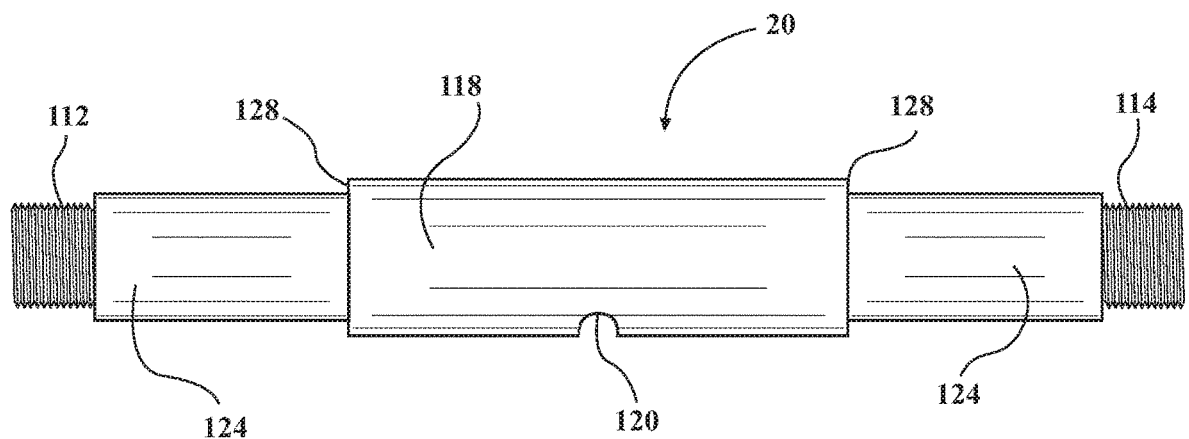
FIG. 12 is a side, plan view of an axle of the vertically adjustable caster wheel assembly.

To provide for rotation of the wheels 26, the axle 20 is illustrated in detail in FIG. 12 and can be fabricated from any suitable material, such as steel. The axle 20 can be substantially solid with threading on a first end 112 and a second end 114, which allows lock nuts 116 to be secured to the first and second ends 112, 114 of the axle 20. A center portion 118 of the axle 20 can be disposed or press fit within the bore 98 of the axle housing 18 and is sized to accommodate such. The center portion 118 of the axle 20 can be provided with an aperture 120 capable of receiving a drive pin 122 (shown in FIG. 1). When the center portion 118 of the axle 20 is disposed within the bore 98 of the axle housing 18, the aperture 120 of the axle 20 aligns with the aperture 106 so that the drive pin 122 can extend through the axle 20 and the axle housing 18 to prevent rotation of the axle 20 relative to the axle housing 18.

Two intermediary portions 124 of the axle 20 can be disposed between the center portion 118 and the first and second ends 112, 114, respectively. The intermediary portions 124 can have substantially the same diameter, which can be less than the diameter of the center portion 118 and greater than the diameter of the first and second ends 112, 114. When the center portion 118 of the axle 20 is disposed within the bore 98 of the axle housing 18, wheel bearings 126 can be seated against shoulders 128 formed between the center portion 118 and the first and second ends 112, 114 of the axle 20, followed by the wheels 26, spacer tubes 130, wheel bearings 132, washers 134, and the lock nuts 116 (shown in FIG. 1). The wheel bearings 126, 132 can be provided with a lubricant.

To facilitate vertical adjustment of the caster wheel assembly 10, the inner alignment post 22 is disposed within the upper housing 14 and the lower housing 16 so that the inner alignment post 22, the upper housing 14, and the lower housing 16 are concentric. The inner alignment post 22 is illustrated in detail in FIGS. 13-14 and can be fabricated from any suitable material, such as steel. The inner alignment post 22 can have a generally cylindrical configuration with a threaded first portion 140 that is configured for threadably engaging the threaded center region 62 of the bore 46 of the upper housing 14. The threaded first portion 140 can be provided with cutouts 146 in one end of the inner alignment post 22 that can have a substantially arcuate or C-shape cross-sectional configuration that is complementary to the legs 144 of the rotation restriction member 142. As shown, there are two cutouts 146 that are opposite one another and can be aligned with two of the four cutouts 56 in the bore 46 of the upper housing 14. A counterbored aperture 148 capable of receiving a conventional fastener (not shown) can extend into the inner alignment post 22 from a first end 150.

A shoulder 158 formed on the inner alignment post 22 separates the threaded first portion 140 from a second portion 156 of the inner alignment post 22. A chamfer or recess 160 can be formed between the threaded first portion 140 and the shoulder 158. The shoulder 158 can have a transverse cross-sectional dimension (e.g., a diameter) greater than a transverse cross-sectional dimension (e.g., a diameter) of the threaded first portion 140 and a transverse cross-sectional dimension (e.g., a diameter) of the second portion 156. The second portion 156 of the inner alignment post 22 can be configured so that the second portion 156 can be secured within a bore 162 of the swivel bearing 90 (shown in FIG. 1) via a friction fit with the shoulder 158 of the inner alignment post 22 resting on top of the swivel bearing 90. An aperture 154 coaxially aligned with the counterbored aperture 148 can extend into the second portion 156 of the inner alignment post 22 from a second end 152 of the inner alignment post 22. The aperture 154 is capable of receiving a conventional fastener, such as a screw 138 (shown in FIG. 1). A washer 136 (shown in FIG. 1) can also be used at the second end 152 of the inner alignment post 22 with the screw 138.

Figure 15:
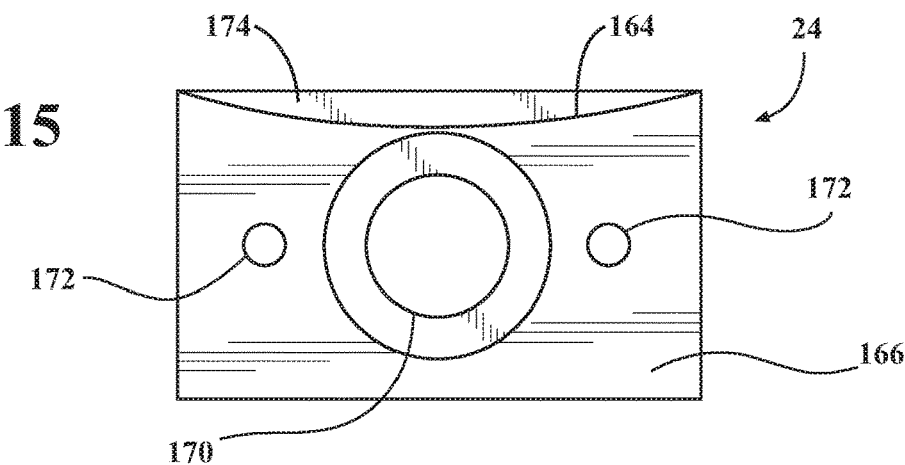
FIG. 15 is a top, plan view of a stop block of the vertically adjustable caster wheel assembly.
Figure 16:
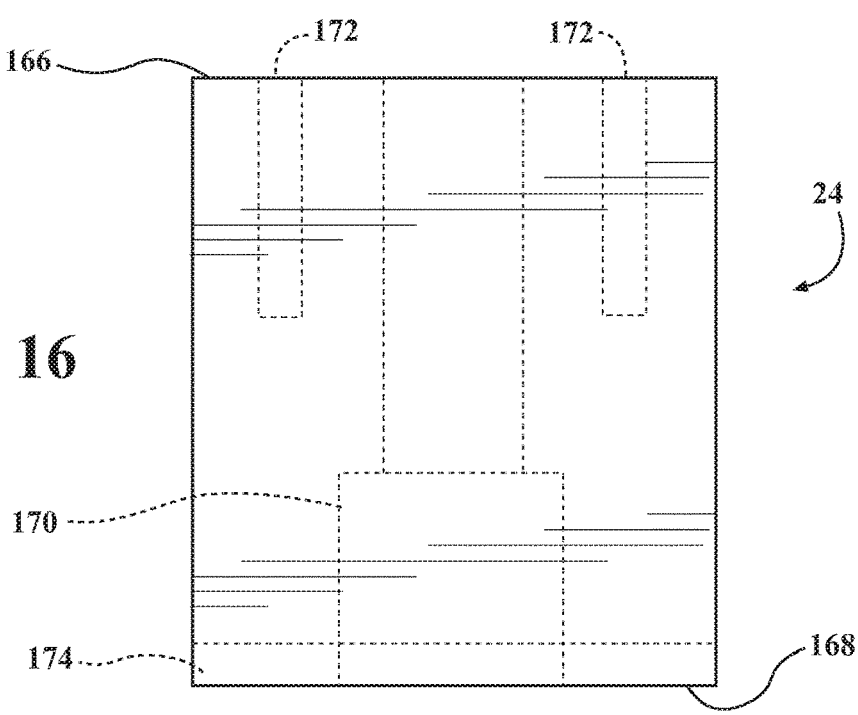
FIG. 16 is a side, plan view of the stop block of the vertically adjustable caster wheel assembly.

To prevent the lower housing 16 from separating from the upper housing 14 through excessive rotation of the inner alignment post 22, the stop block 24 can be mounted to the mounting plate 12 adjacent to the upper housing 14. The stop block 24 is illustrated in detail in FIGS. 15-16 and can be fabricated from any suitable material, such as steel or a polymer. The stop block 24 can have a generally rectangular cuboid configuration with a generally arcuate configuration on a first side 164, which allows the stop block 24 to be mounted flush against the upper housing 14. A counterbore 170 can extend through the stop block 24 from a bottom end 168 to a top end 166, and apertures 172 can extend into the stop block 24 from the top end 166. When the stop block 24 is positioned adjacent to the upper housing 14, the apertures 172 of the stop block 24 align with the second apertures 34 of the mounting plate 12 to allow insertion of the roll pins 38, and the counterbore 170 of the stop block 24 aligns with the third aperture 36 of the mounting plate 12 to allow insertion of the screw 40. A lip 174 can protrude from the first side 164 of the stop block 24 near the bottom end 168 that can engage the lip 92 of the lower housing 16 when the caster wheel assembly 10 is at its greatest vertical height.

Once at a desired vertical height, the rotation restriction member 142 prevents rotation of the inner alignment post 22. As shown in FIG. 1, the rotation restriction member 142 is comprised of the legs 144 and a base 176 that is substantially perpendicular to the legs 144. The legs 144 can be mounted or welded to the base 176. The base 176 can have a substantially disc-like configuration with an aperture 178 extending through a center of the base 176 that is capable of receiving a conventional fastener (not shown). As shown, there are two legs 144 that are linearly aligned with the aperture 178. When the rotation restriction member 142 is disposed within the upper housing 14, the base 176 is seated against the first shoulder 52 formed in the bore 46 with the legs 144 positioned within the cutouts 56 of the bore 46 and cutouts 146 of the inner alignment post 22.

Figure 13:
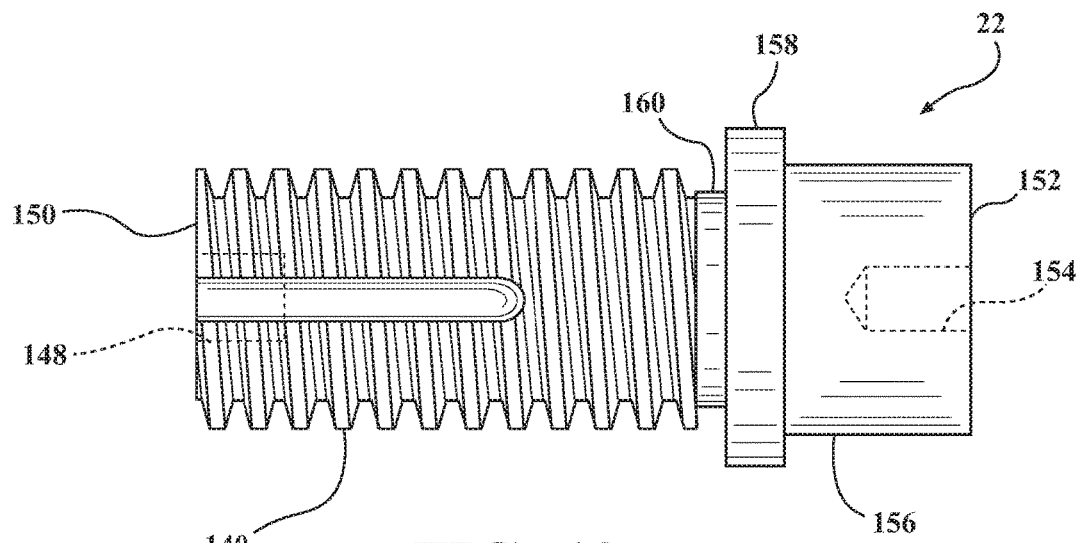
FIG. 13 is a side, plan view of an inner alignment post of the vertically adjustable caster wheel assembly.
Figure 14:
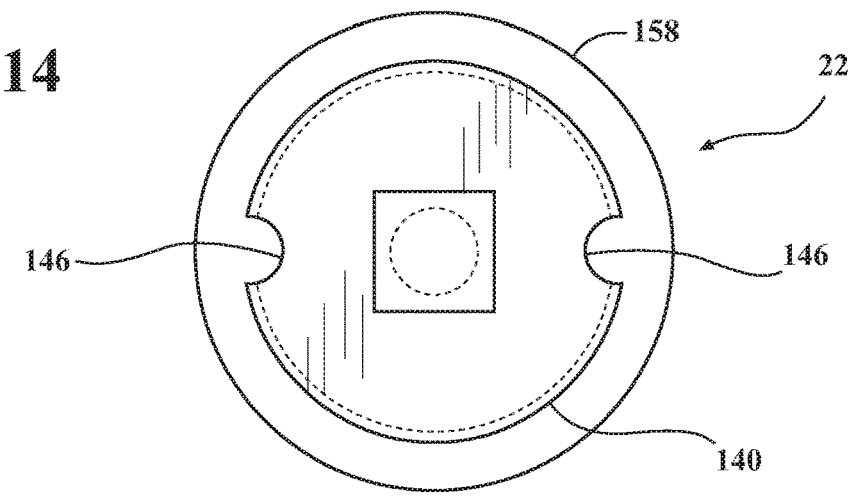
FIG. 14 is a top, plan view of the inner alignment post of the vertically adjustable caster wheel assembly.

To adjust the vertical height of the caster wheel assembly 10, the rotation restriction member 142 is removed from the upper housing 14. If the caster wheel assembly 10 is attached to the industrial vehicle, the industrial vehicle can provide an aperture (not shown) in the floor of the industrial vehicle that allows access to the rotation restriction member 142 from above, thereby obviating any need for disassembly of the caster wheel assembly 10 and increasing the ease of operation in relation to known systems. Once the rotation restriction member 142 has been removed, the inner alignment post 22 can be rotated. For example, in one embodiment, it is envisioned that rotation of the inner alignment post 22 may be effected via rotation of the fastener inserted into the aperture 148 (FIG. 13).

Because of the complementary threading in the center region 62 of the bore 46 of the upper housing 14 and the threaded first portion 140 of the inner alignment post 22, rotation in a first direction causes the vertical height of the caster wheel assembly 10 to increase and rotation in a second direction opposite the first direction causes the vertical height of the caster wheel assembly 10 to decrease. The lip 174 on the stop block 24 and the lip 92 on the lower housing 16 prevent the inner alignment post 22 from being rotated so far in the first direction that the lower housing 16 separates from the upper housing 14.

Once the desired vertical height of the caster wheel assembly 10 has been obtained, the rotation restriction member 142 is replaced so that the base 176 is seated against the first shoulder 52 formed in the bore 46 and the legs 144 positioned within the cutouts 56 of the bore 46 and cutouts 146 of the inner alignment post 22. A conventional fastener, such as a screw, can then be inserted into the aperture 178 of the rotation restriction member 142 and the counterbored aperture 148 of the inner alignment post 22 to secure the rotation restriction member 142 to the inner alignment post 22.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

The invention claimed is:

1. An adjustable assembly for a caster wheel, comprising:
a lower housing connectable to the caster wheel;
an upper housing positioned within the lower housing; and
an alignment post positioned within the upper housing and the lower housing, the alignment post including a threaded portion configured and dimensioned for engagement with a threaded portion of the upper housing such that rotation of the alignment post in a first direction causes the upper housing to move away from the lower housing to increase a height of the adjustable assembly, and rotation of the alignment post in a second direction causes the upper housing to move toward the lower housing to decrease the height of the adjustable assembly,
wherein the lower housing is rotatable with respect to the upper housing and the alignment post.

2. The adjustable assembly of claim 1, wherein the lower housing, the upper housing, and the alignment post are positioned in concentric relation.

3. The adjustable assembly of claim 1, wherein the alignment post is configured, dimensioned, and positioned such that the alignment post is vertically accessible from above the upper housing.

4. The adjustable assembly of claim 1, wherein the alignment post includes a first section including the threaded portion and a second, non-threaded section spaced longitudinally from the first section.

5. The adjustable assembly of claim 4, wherein the alignment post further includes a shoulder positioned between the first and second sections.

6. The adjustable assembly of claim 5, wherein the first section of the alignment post defines a first diameter, the second section of the alignment post defines a second diameter, and the shoulder defines a third diameter, the third diameter being greater than the first and second diameters.

7. The adjustable assembly of claim 4, further including a swivel bearing positioned within the lower housing, the swivel bearing including a bore configured and dimensioned to receive the alignment post.

8. The adjustable assembly of claim 7, wherein the second section of the alignment post is configured and dimensioned for insertion into the bore of the swivel bearing.

9. The adjustable assembly of claim 8, wherein the second section of the alignment post and the bore of the swivel bearing are configured and dimensioned such that the second section of the alignment post is received by the bore of the swivel bearing in a friction fit.

10. The adjustable assembly of claim 1, further including a rotation restriction member configured and dimensioned for engagement with the alignment post and the upper housing to restrict rotation of the alignment post.

11. The adjustable assembly of claim 10, wherein the rotation restriction member includes an engagement structure configured and dimensioned for engagement with a corresponding receiving structure formed on the alignment post.

12. The adjustable assembly of claim 1, wherein the upper housing includes opposing ends each defining openings that are approximately equivalent in diameter and a bore extending between the opposing ends, the bore including a center region with a stepped configuration defining a diameter less than the diameters defined by the openings at the opposing ends of the upper housing whereby the center region of the bore includes an internal shoulder.

13. The adjustable assembly of claim 12, wherein the center region of the bore includes a plurality of shoulders defining progressively smaller diameters.

14. The adjustable assembly of claim 1, further including a stop member that engages at least one of the upper housing or lower housing to limit vertical adjustment of the adjustable assembly.

15. The adjustable assembly of claim 14, wherein the stop member is configured, dimensioned, and positioned for engagement with the lower housing.

16. An adjustable assembly for a caster wheel, comprising:
a lower housing;
an upper housing positioned with the lower housing and comprising a threaded portion;
an alignment post rotatably positioned within the upper housing, the alignment post comprising a pair of longitudinal cutouts and a threaded portion configured and dimensioned for engagement with the threaded portion of the upper housing such that rotation of the alignment post in a first direction increases a height of the adjustable assembly, and rotation of the alignment post in a second direction decreases the height of the adjustable assembly; and
a pair of legs configured and dimensioned for engagement with the pair of longitudinal cutouts in the alignment post to restrain rotation of the alignment post.

17. An adjustable assembly for a caster wheel, comprising:
first and second housings configured and dimensioned for relative displacement along a vertical axis; and
an alignment post positioned concentrically with respect to the first and second housings, the alignment post being configured and dimensioned for rotation with respect to the first housing to cause relative displacement between the first and second housings along the vertical axis to vary a height of the adjustable assembly, the alignment post being configured, dimensioned, and positioned such that the alignment post is vertically accessible through an aperture defined in a mounting plate above the first and second housings, and the second housing is rotatable with respect to the first housing and the alignment post.

18. The adjustable assembly of claim 17, wherein the alignment post includes a threaded section, and the first housing includes a threaded section configured and dimensioned for engagement with the threaded section of the alignment post such that rotation of the alignment post in a first direction causes separation of the first and second housings, and rotation of the alignment post in a second direction causes approximation of the first and second housings.

19. The adjustable assembly of claim 17, further including a rotation restriction member configured and dimensioned for engagement with the alignment post to restrict rotation of the alignment post.

20. A method for height adjustment of a caster wheel assembly, the method comprising:
   vertically accessing an alignment post from above the caster wheel assembly through an aperture defined in a mounting plate while the caster wheel assembly is connected to an industrial vehicle;
   rotating the alignment post in relation to a first housing of the caster wheel assembly to cause relative displacement of the first housing and a second housing along a vertical axis; and
   rotating the second housing relative to the first housing and the alignment post.

* * * * *